United States Patent [19]
Friedlander et al.

[11] 3,842,342
[45] Oct. 15, 1974

[54] VOLTAGE STABILISING ARRANGEMENTS

[75] Inventors: Erich Siegfried Friedlander, Sutton Coldfield; Hemesh Laxmidas Thanawala, Stafford, both of England

[73] Assignee: Associated Electrical Industries Limited, London, England

[22] Filed: June 12, 1973

[21] Appl. No.: 369,191

[30] Foreign Application Priority Data
Aug. 14, 1972   Great Britain.................... 37799/72

[52] U.S. Cl................ 323/124, 323/110, 317/61.5
[51] Int. Cl. ........................................... H02j 3/12
[58] Field of Search ........... 323/76, 79, 81, 93, 110, 323/124; 307/92, 93, 103, 104; 317/12 B, 20, 14 B, 14 K, 61.5

[56] References Cited
UNITED STATES PATENTS
| | | | |
|---|---|---|---|
| 2,600,204 | 6/1952 | Carleton | 323/110 |
| 3,139,577 | 6/1964 | Krezek | 323/124 X |

FOREIGN PATENTS OR APPLICATIONS
| | | | |
|---|---|---|---|
| 1,123,582 | 8/1968 | Great Britain | 323/124 |
| 1,176,415 | 1/1970 | Great Britain | 323/124 |

*Primary Examiner*—Gerald Goldberg
*Attorney, Agent, or Firm*—Kirschstein, Kirschstein, Ottinger & Frank

[57] ABSTRACT

A voltage stabilising arrangement for alternating current supplies in which a H.T. transmission line supplies a lower voltage feed conductor via a step-down transformer, having a saturated reactor connected to the feed conductor, a first series capacitor associated directly with the reactor for compensating the slope reactance of the reactor, and at least one other series capacitor associated with the transformer for compensating the leakage reactance of the latter, with the capacitors chosen so that together they provide slope compensation for the transmission line, each said capacitor having at least one by-pass filter in parallel with it for suppressing instability-generating harmonics which may be generated within the arrangement.

With such an arrangement it is possible to create constant voltage levels both on the H.T. line and the feed conductor.

4 Claims, 3 Drawing Figures

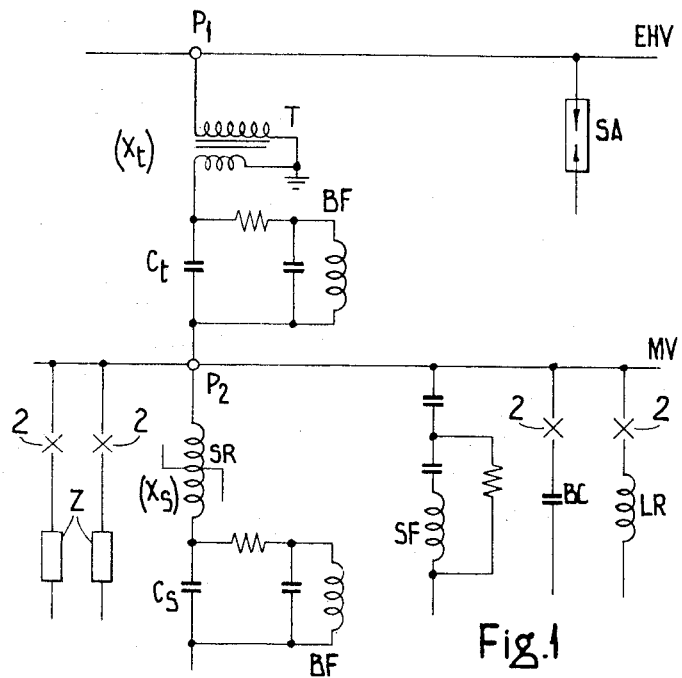
Fig.1
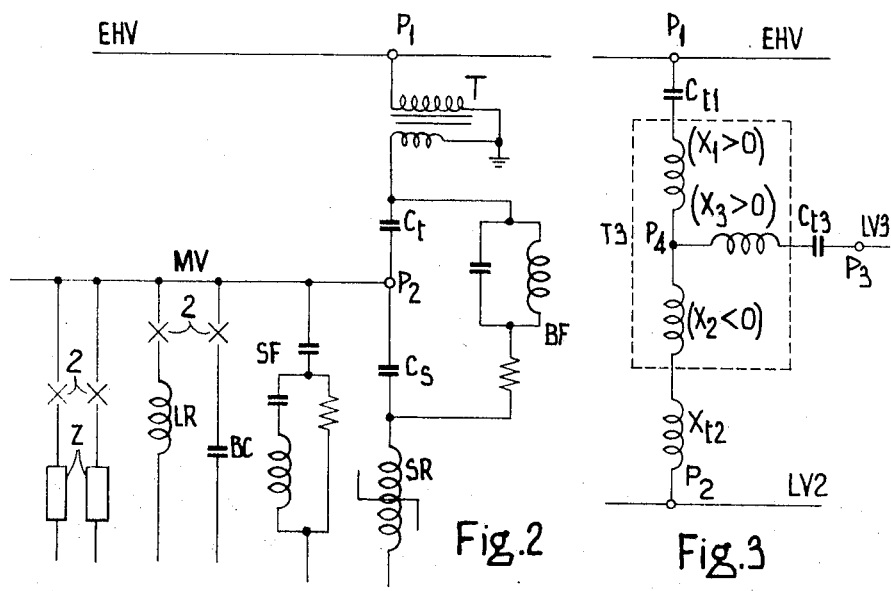
Fig.2
Fig.3

VOLTAGE STABILISING ARRANGEMENTS

This invention relates to voltage stabilising arrangements for alternating current supplies, and in particular to voltage stabilising arrangements of the kind comprising at least one reactor arranged to operate in the alternating current saturated condition, one such voltage stabilising arrangement being described, for example, in Great Britain Pat. No. 1,123,582.

So-called slope compensating capacitors may be connected in series with the saturated reactors in voltage stabilising arrangements of this kind for reducing the voltage change resulting from a change of reactive current, such slope compensation, as it is generally known, providing a still further improvement in stability for some forms of supply systems.

The application of such a stabilising arrangement directly to extra high voltage (EHV) transmission lines, however, gives rise to difficulties on account of the very stringent requirements of surge behaviour which are not easily compatible with the complexity of windings required to be employed in saturated reactors designed to give selective suppression of instability-producing harmonics.

The mere connection of a saturated reactor stabilising arrangement having a series-connected slope compensating capacitor direct to the low voltage winding of a high voltage step-down transformer connected between the transmission line and a lower voltage feed conductor such as a bus-bar supplying one or more load circuits, makes it necessary to over-compensate the slope reactance of the saturated reactor itself to include the presence of the large leakage reactance of the transformer. This leads to a drooping characteristic on the lower voltage feed conductor, which is undesirable in such cases where it would be desirable to use the low voltage bus-bar for any other purposes, including for the connection of line boosting shunt capacitors.

An object of the present invention is to provide a form of voltage stabilising arrangement by which this difficulty can be substantially avoided.

According to the invention in a voltage stabilising arrangement for alternating current supplies, of the kind incorporating at least one saturated reactor and designed for stabilising the voltage in a high voltage transmission line having a lower voltage feed conductor connected thereto via a step-down transformer, the saturated reactor is connected to the feed conductor, a first series capacitor is associated directly with the reactor for compensating the slope reactance of the reactor, and at least one other series capacitor is associated with the transformer for compensating the leakage reactance of the latter, with the capacitors chosen so that together they provide slope compensation for maintaining a substantially constant voltage in the transmission line, and wherein each said slope compensating capacitor has one or more by-pass filters connected in parallel therewith for suppressing instability-producing harmonics or sub-harmonics which may be generated within the system.

It has been found that by this means it is possible to create not only one constant voltage level on the high voltage transmission line, but also a second constant voltage level on the feed conductor, the values of the capacitors providing the correct slope compensation for both the transmission line and the feed conductor in any particular supply network being given by the reactances to be compensated.

The by-pass filter or filters may for example take any of the forms described in British Pat. No. 1,176,415.

The invention has the further advantage that it enables the size of any shunt stabilising filters such as are described in British Pat. No. 1,176,415, switched boost capacitors or switched linear reactors required to be associated with the saturated reactor to be reduced, and also makes it possible to connect independent load circuits to the feed conductor without the voltage varying due to varying system conditions on the high voltage transmission line. Further advantages are that problems of overstressing surge arresters on the EHV system by the presence of large boost capacitors are largely prevented by the inherent interposition of the transformer leakage reactance, and that the cost of equipment including switchgear required to be associated with the boost capacitors is very much reduced compared with those designed for use on higher voltages.

Where the capacitors are connected immediately in series, one on each side of the feed conductor, the by-pass filter system can be common to and connected across both capacitors.

Where the transformer has a plurality, for example two, secondary windings supplying a corresponding number of lower voltage feed conductors, the slope compensating capacitor associated with the transformer is conveniently provided by an appropriate number of individual components to create independent substantially constant voltage points for each of the separate lower voltage conductors as well as the transmission line.

In the case of a three winding transformer the leakage reactances usually involve two positive and one negative reactance and the splitting of the slope compensating capacitor will in such a case require independent capacitors for the positive leakage components and a reactor in place of a capacitor for the negative reactance component.

Two different embodiments of the invention will now be described by way of example with reference to FIGS. 1 and 2 of the accompanying schematic drawing, a modification of the arrangement shown in FIG. 1 being illustrated in FIG. 3.

Referring first to FIG. 1 of the drawings there is shown a medium voltage bus-bar MV supplying a number of load circuits Z through switches 2 and connected to a very high voltage transmission line EHV by means of a high voltage step-down transformer T.

A saturated reactor voltage stabiliser SR, for example of the form described in British Pat. No. 1,123,582, is connected to the bus-bar so as to be in shunt with the load circuits Z.

In order to minimise the voltage change on the transmission line EHV due to changes in reactive current there are provided, in accordance with the invention, two series slope compensating capacitors $C_t$, $C_s$, the first being connected between the low voltage winding of the transformer T and the bus-bar MV, and the second being connected directly in series with the reactor SR as shown.

In this way it is possible to create two constant voltage levels, the first P1 on the transmission line EHV and the second P2 on the bus-bar MV.

This has the effect of economising in the size of any shunt harmonic-compensating filters, switched boosting capacitors or switched linear reactors required to be used as at SF, BC and LR respectively, and it makes it possible to connect additional independent load circuits to the bus-bat MV without the voltage varying due to varying system conditions on the high voltage transmission line EHV.

Further advantages of the arrangement are that problems of overstressing surge arresters SA due to the large energy storage in boosting capacitors are prevented by the inherent interposition of the transformer leakage reactance $X_t$ and that the cost of all equipment including the switchgear required is very much reduced for equipment designed for a medium voltage range compared with that designed for higher voltages.

By-pass filters BF, for example as described in British Pat. No. 1,176,415, are conveniently connected across the slope-compensating capacitors for suppressing instability-producing harmonics or sub-harmonics.

The second arrangement illustrated in FIG. 2 is similar to that described in FIG. 1, and the same reference notation has been used to denote the same components as in the previous FIGURE.

In this arrangement, however, the slope-compensating capacitor $C_s$ associated with the saturated reactor SR is connected between the reactor and the medium voltage bus-bar MV, and this capacitor and the other slope-compensating capacitor $C_t$ share a common by-pass filter system BF connected across both capacitors $C_s$, $C_t$ as shown.

The basic principle of the separation of networks by intermediate slope-compensation demonstrated in FIGS. 1 and 2 for a two-winding transformer, can, however, also be applied to the very common use of three-winding transformers connecting, for instance, an EHV transmission system with two lower voltage lines.

The equivalent scheme for such a transformer connection is shown in FIG. 3, in which the three-winding transformer is shown at T3, the two secondary windings S2, S3 of the transformer being connected to two lower voltage lines LV2, LV3 as shown. As is well known the component leakage reactances X1, X2 and X3 of such transformers usually involve two positive and one negative reactance. The application of the invention to such an arrangement with a saturated reactor stabiliser (not shown) connected, for example, to the line LV3 will involve the creation of independent constant voltage points P1, P2 and P3 for the external connection points of the transformer, and will inherently involve a further constant voltage at the common connection point P4. The slope-compensating capacitor associated with the transformer will, in this case, therefore require independent capacitors $C_{t1}$ and $C_{t3}$ for the positive leakage components and a reactor $X_{t2}$ for the negative leakage reactance, assumed in this case to refer to the winding feeding the line LV2.

By-pass filters (not shown) must in such a case be applied independently to all the separate slope-compensating capacitors.

It will be appreciated that overvoltage protection, by either independent by-pass reactors, or saturation of the by-pass filter reactors, or by any other known means, can be provided as necessary for protecting the series capacitors but such protection means have been omitted from the drawings for simplicity.

We claim:

1. A voltage stabilising arrangement for alternating current supplies, of the kind incorporating at least one saturated reactor and designed for stabilising the voltage in a high voltage transmission line having a lower voltage feed conductor connected thereto via a step-down transformer, wherein the saturated reactor is connected to the feed conductor, and the arrangement incorporates a first series capacitor associated directly with the reactor for compensating the slope reactance of the reactor, at least one other series capacitor associated with the transformer for compensating the leakage reactance of the latter, with the capacitors chosen so that together they provide slope compensation for maintaining a substantially constant voltage in the transmission line, and a by-pass filter system connected in parallel with the slope compensating capacitors for suppressing instability-producing harmonics or sub-harmonics which may be generated within the arrangement.

2. A voltage stabilising arrangement according to claim 1 in which the capacitors are connected immediately in series with each other, one on each side of the feed conductor, wherein the by-pass filter system is common to and is connected across both capacitors.

3. A voltage stabilising arrangement according to claim 1 in which the transformer has a plurality of secondary windings supplying a corresponding number of lower voltage feed conductors, wherein the slope compensating capacitor associated with the transformer is provided by a number of individual components connected each in series with a respective winding of the transformer to create independent substantially constant voltage points for each of the separate lower voltage conductors as well as the transmission line.

4. A voltage stabilising arrangement according to claim 3 wherein the transformer has two secondary windings each connected to a respective lower voltage feed conductor, and the individual components comprise independent capacitors associated with the primary and one secondary winding, and a reactor associated with the other secondary winding.

* * * * *